United States Patent [19]

Frushour

[11] Patent Number: 4,776,861

[45] Date of Patent: Oct. 11, 1988

[54] POLYCRYSTALLINE ABRASIVE GRIT

[75] Inventor: Robert H. Frushour, Ann Arbor, Mich.

[73] Assignee: General Electric Company, Schenectady, N.Y.

[21] Appl. No.: 890,783

[22] Filed: Jul. 23, 1986

Related U.S. Application Data

[63] Continuation of Ser. No. 731,347, May 6, 1985, abandoned, which is a continuation of Ser. No. 527,403, Aug. 29, 1983, abandoned.

[51] Int. Cl.$^4$ .............................................. B24D 3/02
[52] U.S. Cl. ...................................... 51/293; 51/298; 51/308; 51/309
[58] Field of Search .................. 51/293, 298, 308, 309

[56] References Cited

U.S. PATENT DOCUMENTS

| | | | |
|---|---|---|---|
| 2,077,345 | 4/1937 | Van der Pyl | 51/309 |
| 2,137,200 | 11/1938 | Boyer | 51/209 R |
| 2,137,201 | 11/1938 | Boyer | 75/243 |
| 2,173,833 | 9/1939 | Fitz-Randolph | 75/243 |
| 2,238,351 | 4/1941 | Van der Pyl | 428/564 |
| 2,270,209 | 1/1942 | Van der Pyl | 428/564 |
| 2,561,709 | 7/1951 | Norling | 75/243 |
| 2,828,197 | 3/1958 | Blackmer, Jr. | 428/568 |
| 3,087,803 | 4/1963 | Bakian | 51/298 |
| 3,141,746 | 7/1964 | DeLai | 51/307 |
| 3,369,879 | 2/1968 | Miller | 51/309 |
| 3,609,818 | 10/1971 | Wentorf, Jr. | 425/77 |
| 3,645,706 | 2/1972 | Bovenkerk et al. | 51/295 |
| 3,743,489 | 7/1973 | Wentorf, Jr. et al. | 51/307 |
| 3,745,623 | 7/1973 | Wentorf, Jr. et al. | 51/307 |
| 3,767,371 | 10/1973 | Wentorf, Jr. et al. | 51/307 |
| 3,902,873 | 9/1975 | Hughes | 51/298 |
| 3,904,391 | 9/1975 | Lindstrom et al. | 51/295 |
| 3,913,280 | 10/1975 | Hall | 51/307 |
| 4,041,650 | 8/1977 | Sawluk | 51/206 R |
| 4,104,344 | 8/1978 | Pope et al. | 264/42 |
| 4,224,380 | 9/1980 | Bovenkerk et al. | 51/307 |
| 4,278,448 | 7/1981 | Ishizuka et al. | 51/295 |
| 4,378,233 | 3/1983 | Carver | 51/298 |

*Primary Examiner*—Paul Lieberman
*Assistant Examiner*—Willie J. Thompson
*Attorney, Agent, or Firm*—Harness, Dickey and Pierce

[57] ABSTRACT

Diamond or CBN polycrystalline abrasive grit useful in tools for grinding or cutting is made by size reducing and leaching non-diamond or non-CBN material from a compact greater than 1,000 microns in diameter to provide polycrystalline abrasive grit having a size of from about 1 to about 1,000 microns in diameter and having a network of inter-connected, empty pores dispersed throughout.

31 Claims, No Drawings

POLYCRYSTALLINE ABRASIVE GRIT

This is a continuation of U.S. patent application Ser. No. 731,347, filed May 6, 1985 abandoned, which is a continuation of U.S. patent application Ser. No. 527,403, filed August 29, 1983, now abandoned.

BACKGROUND OF THE INVENTION

The present invention relates to polycrystalline abrasive grit, to a method for making the abrasive grit and to tools having a cutting or abrading surface wherein the abrasive grit is held in a binder. A tool of the present invention may be a drill bit or dressing tool or an impregnated tool such as a grinding wheel, saw, honing stone or the like.

Methods and apparatus for making polycrystalline diamond or cubic boron nitride (CBN) compacts are well known. For example, methods for making diamond compacts are taught in U.S. Pat. No. 3,141,746, July 21, 1964, to DeLai, and in later U.S. Pats. Nos. 3,609,818, Oct. 5, 1971, and 3,745,623, July 17, 1973, both to Wentorf, Jr., et al, and 4,224,380, Sept. 23, 1980 to Bovenkerk, et al. A method for making a CBN compact is taught in U.S. Pat. No. 3,767,371, Oct. 23, 1973, to Wentorf, Jr., et al.

Generally speaking, polycrystalline diamond or CBN compacts are made by high-pressure, high-temperature processing wherein diamond or CBN particles are compressed and heated in the presence of a metallic catalyst or sintering aid material. Under the proper pressure and temperature conditions, diamond to diamond or CBN to CBN bonds are catalyzed to bond the diamond to CBN particles together in a polycrystalline compact. The resulting polycrystalline compact can then be used as an abrasive tool or can be subjected to still further process steps.

One further process step involves leaching non-diamond or CBN material from the compact. For example, U.S. Pats. Nos. 4,224,380, Sept. 23, 1980, to Bovenkerk, et al, and 4,104,344, to Pope, et al, teach chemically leaching non-diamond material such as sintering aid or catalytic material to provide a polycrystalline compact consisting essentially of self-bonded, abrasive particles with a network of inter-connected, empty pores dispersed throughout.

In accordance with the present invention, a polycrystalline diamond or CBN compact is subjected to leaching and size reduction steps to provide polycrystalline abrasive grit having substantially uniform physical properties; for example, abrasion resistance and fracture toughness properties. Thus, the present invention facilitates production of tools with abrasive grit of substantially uniform, consistent physical properties. The present invention also facilitates the selection of abrasive grit having the specific physical properties desired for a specific use. Weak polycrystalline grit particles are separated from stronger polycrystalline grit during the process of this invention. Furthermore, each polycrystalline grit comprises a plurality of self-bonded randomly oriented crystals. Hence, the polycrystalline grit can be employed in a tool having consistent strength and hardness characteristics. A tool of the present invention is an improved tool enjoying advantages of improved mechanical bond strength between the grit particles and the binder which can be a resin, metal, plated or vitreous binder. Further understanding of the present invention will be obtained from the following disclosure.

SUMMARY OF THE INVENTION

Abrasive grit of the present invention comprises polycrystalline, self-bonded diamond or cubic boron nitride abrasive grit of from about 1 to about 1,000 microns in diameter. Each abrasive grit is further characterized by having a network of inter-connected, empty pores dispersed throughout each particle, said pores comprising between about 1% and about 30% by volume of the grit.

The polycrystalline grit is made by the process of:

(1) providing a polycrystalline compact greater than 1,000 microns in diameter and comprising self-bonded abrasive particles selected from the group consisting of diamond and cubic boron nitride particles;

(2) size reducing the particles to a size of from about 1 to about 1,000 microns in diameter; and (3) leaching non-particulate matter from the particles.

Optionally and preferably, an additional step of shaping the grit to provide a desirable blocky shape thereto is carried out. Also optionally and preferably, an additional step of sizing is carried out to classify the grit according to size to thereby provide selected sized particles for specific uses.

A tool of the present invention comprises a binding medium having imbedded therein abrasive grid made in accordance with the present invention.

DESCRIPTION OF THE PREFERRED EMBODIMENTS

In accordance with the present invention, polycrystalline abrasive grit useful in tools for grinding, honing, sawing, cutting, polishing and the like is provided from a starting material which is a conventional polycrystalline diamond or CBN compact. Suitable polycrystalline compacts are well-known in the art and are taught, for example, in the aforementioned U.S. Pats. Nos. 3,141,746; 3,609,818; 3,745,623; 4,224,380; 3,767,371; 4,224,380; and 4,104,344, each of which is specifically incorporated by reference herein. As taught in U.S. Pat. No. 4,224,380, Sept. 23, 1980, to Bovenkerk, et al, a polycrystalline compact is generally made by steps of:

(a) placing within a reaction cell or charge assembly a mass of abrasive particles selected from the group consisting of diamond particles and CBN particles having a size of from about 0.1 to about 1,000 micrometers and a mass of material which is active as a sintering aid for the selected abrasive particle mass;

(b) simultaneously subjecting the cell and the contents thereof to temperatures in the range of 1,200° C. to 2,000° C. and pressures in excess of 40 kbars;

(c) ceasing the input of heat to the cell;

(d) removing the pressure applied to the cell; and (e) removing from the cell an abrasive body formed by steps (a) to (d) and which is comprised of the particles in a self-bonded form with a metallic phase comprised of a sintering aid material infiltrated throughout the abrasive body.

In short, diamond or CBN compacts are prepared by HP/HT processing wherein hot compressed diamond particles are infiltrated with a catalytic material by axial or radial sweep-through of the material through the diamond particles. During sweep-through, catalyzed sintering of the diamond particles occurs leading to extensive diamond-to-diamond bonding. Suitable catalytic metals as well as apparatus for carrying out the method are well known in the art and are taught in the above-referenced patents.

In accordance with the present invention, a polycrystalline compact having a size of greater than 1,000 microns in diameter is subjected to size reduction and leaching steps. Preferably additional steps or shaping, cleaning and sizing are also carried out. The resulting product is a polycrystalline abrasive grit having a size of from about 1 to 1,000, preferably from about 20 to 1,000 microns in diameter. The grit is suitable for incorporation in a binder for use in an abrasive tool.

During the size reduction step of the present invention, a polycrystalline compact is subjected to high, repeated impact and grinding to reduce the size of the compact to the desired size range of from about 1 to almost 1,000, preferably from about 20 to about 1,000 microns in diameter. A size reduction can be accomplished using conventional apparatus such as a conventional milling apparatus. Preferably the size reduction step is carried out by initially reducing the size of the compact by impact and grinding in, for example, a mortar and pestle-type device followed by a final size reduction in a high-energy, impact mill such as the Vortec Model M-1 Diamond Impact Mill operating at 1,250 to 1,500 rpm. The size reduction process may be repeated until the desired size distribution of from about 1 to about 1,000, preferably from about 20 to about 1,000 micron diameter size is achieved.

After size reduction, the grit particles are optionally and preferably processed to achieve a "blocky" shape. Generally speaking, for most uses an aspect ratio of less than 2 to 1, preferably less than 1.5 to 1, will be desired. By the term "aspect ratio" is meant the ratio of the longest dimension of the grit particle to the shortest dimension of the same grit particle. "Blocking" is conventional in the abrasive art and can be accomplished by use of a ball mill, mortar and pestle, or a jet mill such as 4-inch float energy micro-jet jet mill system. For example, the grit particles can be placed in a stainless steel mill ⅓ full of ⅜-inch carbide balls filled with water and milled for 4–6 hours at 100 rpm, or the grit particles could be placed in a mortar and ground with a pestle to the desired shape, or the grit particles could be processed through a high-energy jet mill at 10 grms per minute feed rate.

During the leaching steps of the present invention, non-diamond material in the case of a polycrystalline diamond compact, or non-CBN material in the case of a CBN compact is substantially removed from the compact leaving a particle having a network of inter-connected, empty pores dispersed throughout and defined by the crystals and remaining metallic phase comprising the particle. Both U.S. Pat. Nos. 4,224,380, Sept 23, 1980, to Bovenkerk, et al, and 4,104,344, Aug. 1, 1978, to Pope, et al teach methods by which leaching can be carried out. Thus, leaching can be carried out by immersion of the particles in acid, or by liquid zinc extraction, electrolytic depleting or any other suitable process leaving particles in self-bonded form with a network of pores throughout. Chemical leaching can be carried out, for example, by placing the particles in hot perchloric acid, hydrofluoric acid, nitric acid, hydrochloric acid or suitable mixtures thereof. As taught in the Bovenkerk, et al patent, the pores comprise from about 5% to about 30% by volume of the compact of Bovernkerk, et al. However, for use herein, leaching can be carried out to provide pores comprising a broader range of from about 1% to about 30% by volume of the particle.

The steps of size reduction and leaching can be carried out in any order; however, it is preferable to carry out the size reduction step first and then carry out the leaching step since leaching will be facilitated by the smaller particles which will be simultaneously cleaned during the leaching step. If the particles are subjected to leaching and then size reduction, it will normally be desirable to clean the particles with a suitable acid solution followed by rinsing with deionized water and drying. Suitable acid solutions are well known in the art and include solutions of sulfuric acid, nitric acid, hydrochloric acid and hydrofluoric acid.

It may be desirble for many uses to have abrasive grit of a selected specific size range. Thus, the grit may be sized to obtain polycrystalline grit of selected size within the broad size range of from about 20 to about 1,000 microns. Sizing can be accomplished in any suitable manner. For example, sieving using selected matched U.S. Standard wire mesh sieves of the following sizes: Nos. 20, 25, 30, 35, 40, 45, 50, 60, 70, 80, 100, 120, 140, 170, 200, 230, 270, 325 and 400, using a 100 gram±5 gram sieve load and a Tyler Rotap for 15 minutes. Sizing accuracy can be determined by testing in accordance with ANSI Standard B74.16-1971. It will, of course, be appreciated that grit of selected size may be preferable for a specific use or in a particular tool. Larger grit of 18/20 mesh size, i.e., grit which will pass through an 18 mesh sieve but not a 20 mesh sieve, will be especially useful in saw blades and core drills. This grit will desirably also be strong and blocky. Small grit of 325/400 mesh size, if strong, will be especially suitable in metal bonded grinding wheels for grinding ceramic or glass. Weaker grit of 325/400 mesh size will be especially suitable in resin bonded grinding wheels for grinding tungsten carbide.

A tool of this invention comprises the desired size polycrystalline grit of the present invention in a suitable bonding medium. The grit may be embedded in and bonded to the medium in any conventional manner and, of course, the grit may be metal clad or coated, if desired, for example, for use in a resin bonded wheel. Tools having diamonds or other particulate abrasives held in place by a vitreous, metallic, plated or resin binding agent are well known as are various methods of making them. Examples of such tools which can incorporate the abrasive particles of the present invention are disclosed in U.S. Pats. Nos. 2,077,345, Apr. 13, 1937, to Van der Pyl; 2,137,200, Nov. 15, 1938, to Boyer; 2,137,201, Nov. 15, 1938, to Boyer; 2,173,833, Sept. 26, 1939, to Fitz-Raldolph; 2,238,351, Apr. 15, 1941, to Van der Pyl; 2,270,209, Jan. 13, 1942, to Van der Pyl; 2,561,709, to Nowling; 3,904,391, Sept. 9, 1975, to Lindstrom et al; 2,828,197, Mar. 25, 1958, to Blackmer; 3,087,803, Apr. 30, 1963, to Bakian; 3,369,879, Feb. 20, 1968, to Miller; 3,902,873, Sept. 2, 1975, to Hughes; 3,645,706, Feb. 29, 1972, to Bovenkerk, et al, the disclosures of which are incorporated by reference herein. The abrasive grit of the present invention has a porous structure and, being polycrystalline, presents a plurality of faces and angles. Thus, an abrasive tool of the present invention has good mechanical bond strength between the abrasive grit and binding medium. In addition, each abrasive grit comprises a plurality of randomly oriented crystals. Thus, the orientation of each abrasive grit in the binder will not substantially effect the abrasion resistance or fracture toughness properties of the grit in use. In short, high percent of working grit will be obtained.

The strength of the abrasive material can be well controlled in accordance with the process of this invention. The process parameters employed in making the polycrystalline compact greater than 1,000 microns in diameter can be seleced to provide desired bond strength, from weak to strong, between crystals. The size reduction and optional sizing steps of the present invention can then be employed to selectively obtain the stronger or weaker polycrystalline grit from the compact. Weak polycrystalline material breaks up during the size reduction step and can be separated during the sizing step. Also, as size reduction inherently reduces weak bonds by breaking them and thus size reduction tends to provide smaller, stronger polycrystalline material. It will be appreciated that for some uses strong grit will be desired, while for other uses weaker or more friable grit will be desired. Thus, not only can abrasive grit particles of uniform size and strength be obtained in accordance with the present invention, but the desired size and strength can be controlled. Thus, particular grit best adapted for a particular use or tool can be employed to provide an improved tool.

A further understanding of the present invention can be obtained from the following examples.

EXAMPLE 1

A diamond compact is made in accordance with sample B-4 of Example 1 of U.S. Pat. No. 4,224,380. The disc-shaped diamond compact is then subjected to high, repeated impact and grinding in a mortar and pestle device to obtain an initial reduction in size and is then subjected to further size reduction in a Vortec Model M-1 Diamond Impact Mill operating at 1,250 to 1,500 rpm until the size of the crystals is in the 10/15 mesh range (U.S. Standard wire mesh sieve). The crystals are further processed by passing them through a 4-inch fluid-energy Micro-jet jet mill at a feed rate of about 10 grams per minute to found off sharp corners (blocking) and to further reduce the size of the crystals. After jet milling, the crystals are sieved to obtain size distributions through the following matched wire mesh sieves:
16
18
20
25
30
pan The 18/20 mesh product is removed for use as 18/20. The greater than mesh 16 and 16/18 grits are reprocessed through the jet mill and sieved to obtain additional 18/20 grit.

The 18/20 mesh grit is then cleaned in acid baths to remove milling contamination as follows. The 18/20 grit is soaked in each bath for 2 hours at 375° F. and is allowed to cool to room temperature and rinsed with deionized water between acid baths. Bath 1 contains concentrated technical grade sulfuric acid and nitric acid in a 10:1 volume ratio. Bath 2 contains hydrochloric acid and nitric acid in a volume ratio of 2:1, and Bath 3 contains nitric acid and hydrofluoric acid in a volume ratio of 1:1. Finally the grit is rinsed iwth deionized water and dried at 350° F. for 1 hour.

The cleaned grit is then used as abrasive grit in a conventional saw blade.

EXAMPLE 2

The process of Example 1 is carried out except that the discs are initially broken into pieces of 30/45 mesh range and are then processed through the jet mill as described above until the size of 50/60 mesh is obtained.

After each jet milling operation, sieving is performed on the following matched wire mesh sieves:
40
45
50
60
70
80
pan The 50/60 mesh grit is then cleaned as in Example 1 in acid baths to remove milling contamination and then used as abrasive grit in a conventional metal bonded grinding wheel.

EXAMPLE 3

The residue from Example 1, i.e., the grit of less than 20 mesh size, and the residue from Example 2, i.e., the grit of less than 60 mesh size, is processed in an M-1 Vortec mill to reduce the size to approximately 170/200 mesh (110 to 90 microns). This feed stock is then processed through a jet mill to further reduce the size and shape the particles. After each processing, the grit is sieved in the following matched wire mesh sieves:
200
230
270
325
400
pan The 230/270 is removed and the grit of greater than 200 mesh size is then reprocessed through the jet mill to produce an additional 230/270 cut. The process is repeated until the feed stock of greater than 200 mesh size is eliminated. The 230/270 grit is then cleaned in acid baths as in Example 1 to remove milling contamination and is then used as abrasive grit in a metal-bonded grinding wheel.

EXAMPLE 4

A polycrystalline diamond compact is made in accordance with Example 1 of U.S. Pat. No. 3,609,818. The thin layer of zirconium remaining on the compact is ground off and then the compact is subjected to high, repeated impact and grinding in a mortar and pestle device to obtain an initial reduction in size and is then subjected to further size reduction in a Vortec Model M-1 Diamond Impact Mill operating at 1,250 to 1,500 rpm until the size of the grit is in the 10/15 mesh range (U.S. Standard wire mesh sieve). The grit is then further processed by passing them through a 4-inch fluid-energy Micro-jet jet mill at a feed rate of about 10 grams per minute to found off sharp corners (blocking) and to further reduce the size of the grit. After jet milling, the grit is sieved to obtain size distributions through the following matched wire mesh sieves:
16
18
20
25
30
pan The 18/20 mesh product is removed for use as 18/20. The greater than mesh 16 and 16/18 grits are reprocessed through the jet mill and sieved to obtain additional 18/20 grit.

The 18/20 grit is then subjected to chemical leaching by immersing the grit in a solution of concentrated nitric and hydrochloric acid (in a 1 to 1 volume ratio) at 212° F. for 4 hours. The solution is then allowed to cool to room temperature and then decanted. The leaching procedure is repeated 5 times.

Finally, the 18/20 grit is rinsed with deionized water and dried at 350° F. for 1 hour. The 18/20 grit is then used as abrasive grit in a conventional core drill wheel.

What is claimed is:

1. Abrasive grit made by the process of:
   (a) providing a polycrystalline compact greater than 1,000 microns in diameter and comprising self-bonded, abrasive particles selected from the group consisting of diamond and cubic boron nitride particles;
   (b) size reducing said compact to a size of from about 1 to about 1,000 microns in diameter; and
   (c) leaching non-particle matter from said compact.

2. The abrasive grit of claim 1 wherein said abrasive grit comprises diamond.

3. The abrasive grit of claim 1 wherein said abrasive grit comprises cubic boron nitride.

4. The abrasive grit of claim 1 wherein said abrasive grit has a size of from about 20 to about 1,000 microns in diameter.

5. The abrasive grit of claim 1 wherein step (b) is carried out before step (c).

6. The abrasive grit of claim 1 wherein step (c) is carried out before step (b).

7. The abrasive grit of claim 1 wherein said grit has been subjected to an additional step of blocking and has an aspect ratio of less than 2 to 1.

8. The abrasive grit of claim 1 wherein said grit has been subjected to an additional step of sizing.

9. A tool comprising abrasive grit imbedded in a binding medium, said abrasive grit having been made by the steps of:
   (a) providing a polycrystalline compact greater than 1,000 microns in diameter and comprising self-bonded, abrasive particles selected from the group consisting of diamond and cubic boron nitride particles;
   (b) size reducing said compact to a size of from about 1 to about 1,000 microns in diameter; and
   (c) leaching non-particle matter from said compact.

10. The tool of claim 9 wherein said abrasive grit comprises diamond.

11. The tool of claim 9 wherein said abrasive grit comprises cubic boron nitride.

12. The tool of claim 9 wherein said abrasive grit has a size of from about 20 to about 1,000 microns in diameter.

13. The tool of claim 9 wherein step (b) is carried out before step (c).

14. The tool of claim 9 wherein step (c) is carried out before step (b).

15. The tool of claim 9 wherein said grit has been subjected to an additional step of blocking and has an aspect ratio of less than 2 to 1.

16. The tool of claim 9 wherein said grit has been subjected to an additional step of sizing.

17. The tool of claim 9 wherein said binding medium is a metal binder.

18. The tool of claim 9 wherein said binding medium is a resin binder.

19. The tool of claim 9 wherein said binding medium is a vitreous binder.

20. The tool of claim 9 wherein said binding medium is a plated binder.

21. The tool of claim 9 wherein said tool is a saw blade.

22. The tool of claim 9 wherein said tool is a grinding wheel.

23. The tool of claim 9 wherein said tool is a drill.

24. The method of making abrasive grit comprising the steps of:
   (a) providing a polycrystalline compact greater than 1,000 microns in diameter and comprising self-bonded, abrasive particles selected from the group consisting of diamond and cubic boron nitride particles;
   (b) size reducing said compact to a size of from about 1 to about 1,000 microns in diameter; and
   (c) leaching non-particle matter from said compact.

25. The method of claim 24 wherein said grit has been subjected to a blocking step and has an aspect ratio of less than 2 to 1.

26. The method of claim 24 wherein said particles of step (b) are subjected to a sizing step.

27. The method of claim 24 wherein said particles are reduced in size to from about 20 to about 1,000 microns in diameter.

28. The method of claim 24 wherein said particles are diamond.

29. The method of claim 24 wherein step (b) is carried out before step (c).

30. The method of claim 24 wherein step (c) is carried out before step (b).

31. The method of claim 24 wherein following step (c), said particles are bonded to a tool.

* * * * *